DIFFERENTIAL CIRCUIT, ESPECIALLY FOR READING MAGNETIC-LAYER STORAGE SYSTEMS

Filed Jan. 26, 1965

United States Patent Office 3,418,603

Patented Dec. 24, 1968

3,418,603

DIFFERENTIAL CIRCUIT, ESPECIALLY FOR READING MAGNETIC-LAYER STORAGE SYSTEMS

Bernard Alexandre, Grenoble, France, assignor to Commissariat à l'Energie Atomique, Paris, France Filed Jan. 26, 1965, Ser. No. 428,079
Claims priority, application France, Jan. 30, 1964, 962,094
1 Claim. (Cl. 333—9)

ABSTRACT OF THE DISCLOSURE

Two pulse signals of equal and opposite value are combined with supression of background noise by transmitting each signal by a coaxial line to one of two distributed constant transformers. Each transformer is a coaxially line wound on a magnetic torus. The outer conductors of the coaxial lines of the transformers are connected in parallel and their inputs are connected to the output of the inner conductor of the coaxial line of the first transformer. The voltage at the outputs of the inner conductors of the coaxial lines of the transformers is supplied to an amplifier.

The present invention relates to a differential circuit, one important application of which is concerned with the reading of storage systems with thin magnetic layers.

It is sometimes necessary to combine by addition two signals, the useful components of which have amplitudes which are equal in absolute value but which are of opposite sign whilst the stray components or background components have identical amplitudes.

This is the case in particular when it is required to process the pulse pairs which appear at the ends of the reading loop of a storage system with thin magnetic layers.

Figure 1:
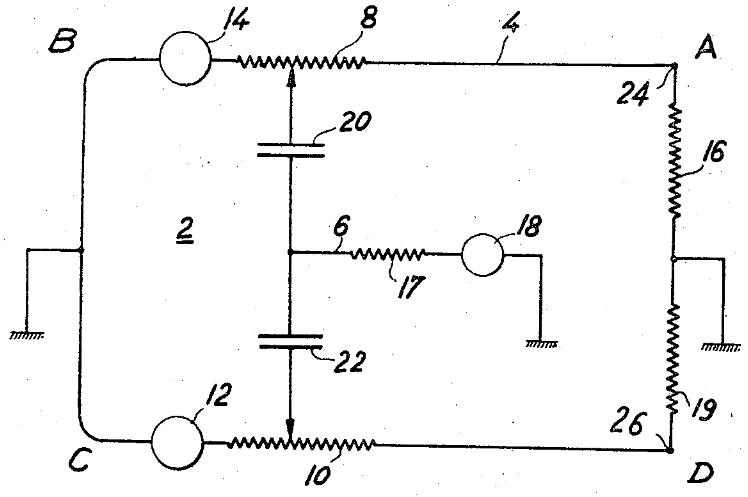

In the accompanying drawings, FIG. 1 represents the equivalent diagram of a reading device 2 which consists of a reading loop 4 (the circuit A B C D) which is associated with a storage element (not shown) and a control loop 6.

The elements 8 and 10 represent the resistance of the reading loop 4, the generators 12 and 14 indicate the action of the storage element on the bottom and top halves of the loop. The load resistors 16–19 close the reading loop. The element 17 represents the resistance of the control loop 6 and the reference 18 designates its generator. The capacitors 20–22 indicate the spurious coupling between the loops 4 and 6.

When the generator 18 transmits an interrogation pulse or control pulse, the magnetization of the thin ferromagnetic strip constituting the storage unit selected is thus triggered and consequently produces in a time *dt* variations $\mp d\Phi$ of flux in the lower and upper reading half-loops in which are induced the voltages $$-\frac{s}{2} \text{ and } +\frac{s}{2} \text{ with } \frac{s}{2}=\frac{d\Phi}{dt}$$

But the production of the control signal then results in the appearance of a stray component having an amplitude P in the two halves of the reading loop 4. It will be noted that the signals $S_1$ and $S_2$ which appear at the terminals A and D are respectively $$S_1=-\frac{s}{2}+P$$

$$S_2=\frac{s}{2}+P$$

It is necessary to employ a differential circuit which is virtually perfect in order to combine the signals $S_1$ and $S_2$ by subtraction or by means of a series of operations equivalent to a substraction with a view to eliminating the background components. The manner in which a circuit of this type could operate correctly at high frequencies was not known in the methods of the prior art.

The present invention has for its object to provide a differential circuit of this type which is characterized in that the essential elements of this circuit are two distributed-constant transformers which are constituted in known manner by a coaxial line associated with a magnetic torus, in that the internal and external conductors of the coaxial line perform respectively the functions of primary and secondary windings of the transformer, that the signals to be combined are respectively applied on the one hand between the inputs of the primary winding and secondary winding of the first transformer and on the other hand between the inputs of the primary winding and secondary winding of the second transformer, and that the secondary windings of said distributed-constant transformers are associated in parallel.

In accordance with a preferred form of embodiment, the signals which it is desired to combine and which are transmitted by separate sections of coaxial lines are respectively applied to the inputs of the coaxial lines of the first and second distributed-constant transformer between the internal conductor and external conductor of each of said lines, the external conductors of said input coaxial lines and the inputs of the external conductors of the lines of said two transformers are coupled to the output of the internal conductor of the line of the first of said transformers, finally the outputs of the external conductors of the lines of said two transformers are also joined together, the output signal which appears between the second extremity of the internal conductor of said second transformer and the second extremity of the internal conductor of said first transformer having an amplitude which is double that of the useful component of each of the input signals but being free from stray components and this signal being intended to be applied to an amplifier through the intermediary of a section of coaxial line.

This circuit performs two operations: (a) the reversing switching of the signal transmitted by one of the channels, and (b) the sum of the reversed signal and of the other signal which is directly transmitted. The said circuit therefore performs the algebraic operation which corresponds to the following equation:

$$\left(\frac{s}{2}+P\right)-\left(-\frac{s}{2}+P\right)=s$$

Figure 2:
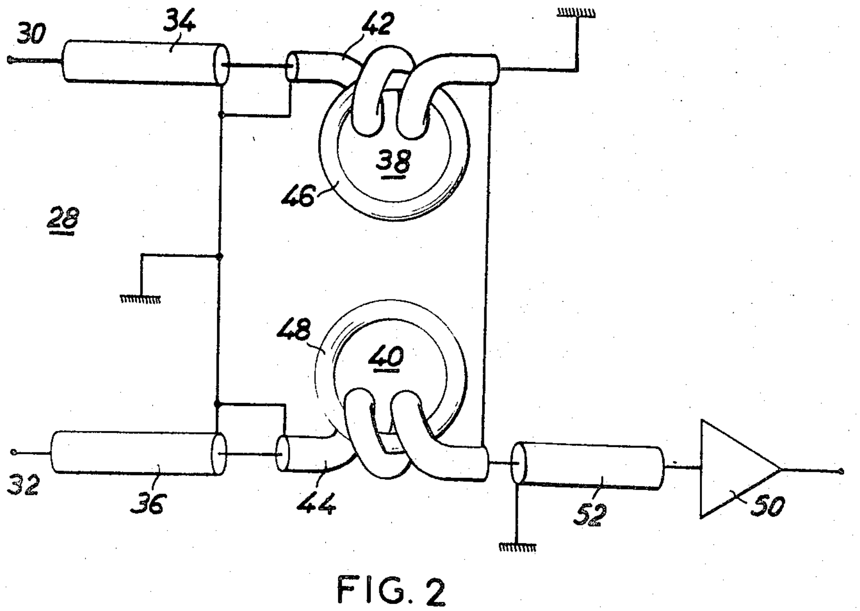

In order that the technical characteristics of the present invention may be more readily understood, there will now be described one example of application of the invention as illustrated by FIG. 2, it being understood that this figure is not given in any limiting sense either in regard to the modes of practical application of the invention or in regard to the purposes for which the invention may be employed.

The computing device 28 is represented in diagrammatic manner in FIG. 2, which does not show certain conventional elements such as impedance adaptation elements. The input signals $$\left(-\frac{s}{2}+P\right)$$

and $$\left(\frac{s}{2}+P\right)$$

are respectively applied to the terminals 30–32 and transmitted by the sections of coaxial transmission line 34–36, the external conductors of which are connected to ground. Each of said coaxial lines is connected to a transformer with distributed constants 38 or 40 which consists in the case of the example under consideration of a coaxial transmission line 42 (or 44) which is wound on a magnetic torus 46 (or 48).

The input of the internal conductor of the line 42 (or 44) is connected to the extremity of the internal conductor of the line 34 (or 36). It should be noted that the external conductors of the grounded lines 34 and 36 are connected respectively to the inputs of the external conductors of the coaxial lines 42, 44. The output of the internal conductor of the line 42 is connected to ground. The outputs of the external conductors of the lines 42 and 44 are connected together. Finally, the output signal appears between the outputs of the internal conductors of the lines 42 and 44. This signal can be transmitted to the amplifier 50 by the coaxial line section 52, the external conductor of which is connected to ground whilst the internal conductor is connected to the output of the internal conductor of the line 44.

It will be observed that the distributed-constant transformer plays the part of a change-over device which transforms the signal $$S_1=-\frac{s}{2}+P \text{ into a signal } S'_1=\frac{s}{2}-P$$

that the distributed-constant transformer 40 transmits the signal $$S_2=\frac{s}{2}+P$$

without modification and that, by virtue of the adding circuit employed, the resultant signal $S=S'_1+S_2=s$ is free from stray components.

The eciency of the circuit is expressed by the ratio:

$$\frac{\text{noise amplitude at the input}}{\text{noise amplitude at the output}} \text{ (either at 30 or at 32)}$$

which, in this example, is equal to 60.

What we claim is:

1. Differential circuit for combining two pulse signals, the useful components of which have amplitudes equal in absolute value and of opposite sign while the background components are identical, said circuit eliminating the background components and comprising first and second distributed-constant transformers each consisting of a coaxial line wound on a magnetic torus, a coaxial transmission line supplying a pulse signal to each of said transformers and connected to the coaxial line of said transformer, the inner and outer conductors of said coaxial line acting respectively as the primary winding and secondary winding of the transformer, the signals to be combined being respectively applied to the inputs of the primary winding and secondary winding of said first transformer and to the inputs of the primary winding and the secondary winding of said second transformer, said secondary windings of said transformer being connected in parallel, the outer conductors of said coaxial lines of said two transformers being connected to the output of the inner conductor of the coaxial line of said first transformer and to ground, the outputs of the outer conductors of the coaxial lines of said two transformers being connected whereby the signals are combined without background components at the output of said second transformer, an amplifier and means for supplying the voltage at the outputs of the internal conductors of said coaxial lines of said transformers to said amplifier.

References Cited

UNITED STATES PATENTS

| | | | |
|---|---|---|---|
| 2,973,488 | 2/1961 | De Long | 333—34 |
| 3,025,480 | 3/1962 | Guanella | 333—33 |
| 3,108,199 | 10/1963 | Ferber | 307—88.5 |
| 3,274,520 | 9/1966 | Eddy et al. | 333—26 |
| 3,305,800 | 2/1967 | Velsunk | 333—32 |

HERMAN KARL SAALBACH, *Primary Examiner.*

C. BARAFF, *Assistant Examiner.*

U.S. Cl. X.R.

333—33, 26, 12; 330—147, 190